United States Patent
Shepherd et al.

(10) Patent No.: US 6,666,990 B2
(45) Date of Patent: Dec. 23, 2003

(54) STRETCHABLE LIQUID CRYSTAL POLYMER COMPOSITION

(75) Inventors: James P. Shepherd, Springfield, NJ (US); H. Clay Linstid, III, Clinton, NJ (US); Vincent J. Provino, Clifton, NJ (US)

(73) Assignee: Ticona LLC, Summit, NJ (US)

( * ) Notice: Subject to any disclaimer, the term of this patent is extended or adjusted under 35 U.S.C. 154(b) by 135 days.

(21) Appl. No.: 09/783,057

(22) Filed: Feb. 14, 2001

(65) Prior Publication Data

US 2002/0150696 A1 Oct. 17, 2002

(51) Int. Cl.$^7$ .............................................. C09K 19/32
(52) U.S. Cl. ................................ 252/299.62; 252/299.01
(58) Field of Search ........................ 252/299.01–299.7; 524/495; 528/190, 332; 523/217; 525/68, 132

(56) References Cited

U.S. PATENT DOCUMENTS

| | | | |
|---|---|---|---|
| 4,130,545 A | 12/1978 | Calundann | 260/40 |
| 4,337,190 A | 6/1982 | Calundann | 524/599 |
| 4,351,918 A | 9/1982 | Charbonneau et al. | 524/602 |

(List continued on next page.)

FOREIGN PATENT DOCUMENTS

| | | |
|---|---|---|
| EP | 0334619 | 9/1989 |
| EP | 0909781 A2 | 4/1999 |
| EP | 0911150 A2 | 4/1999 |
| EP | 0928683 A2 | 7/1999 |
| GB | 2188277 | 9/1987 |
| WO | WO 00/66647 | 11/2000 |

OTHER PUBLICATIONS

R.S. Irwin, "Chain Folding in Thermotropic Polyesters", Macromolecules 1993, vol. 26, pp. 7125–7133.
W.J. Jackson, Jr., "Liquid Crystalline Aromatic Polyesters: An Overview", Journal of Applied Polymer Science: Applied Polymer Symposium, vol. 41, pp. 25–33 (1985).
"Anisotropic Polymers, Their Synthesis and Properties", G.W. Calundann and M. Jaffe, pp. 247–291, Proceedings of the Robert A. Welch Conferences on Chemical Research XXVI, Synthetic Polymers, 1982.
U.S. patent application Ser. No. 09/483,765, Linstid, III et al., filed Jan. 14, 2000.
U.S. patent application Ser. No. 09/483,103, Linstid, III et al., filed Jan. 14, 2000.

*Primary Examiner*—Mark F. Huff
*Assistant Examiner*—Jennifer R. Sadula

(57) ABSTRACT

The present invention relates to a stretchable polymer consisting essentially of recurring units derived from para-oxybenzoyl, 6-oxy-2-naphthoyl and meta-oxybenzoyl. The invention also relates to a process for stretching a multilayer laminate comprising the steps of providing a multilayer laminate comprising a layer of a thermoplastic and a layer of the stretchable polymer, and stretching the laminate greater than about 100% elongation at a temperature less than about 200° C.

29 Claims, 2 Drawing Sheets

U.S. PATENT DOCUMENTS

| | | | |
|---|---|---|---|
| 4,473,682 A | 9/1984 | Calundann et al. | 524/605 |
| 4,522,974 A | 6/1985 | Calundann et al. | 524/605 |
| 4,563,508 A | 1/1986 | Cottis et al. | 525/444 |
| 4,684,712 A | 8/1987 | Ueno et al. | 528/190 |
| 4,722,993 A | 2/1988 | Hisgen et al. | 528/183 |
| 4,910,284 A | 3/1990 | Hijikata et al. | 528/206 |
| 4,912,193 A | 3/1990 | Dicke et al. | 528/193 |
| 4,918,154 A | 4/1990 | Hayashi et al. | 528/190 |
| 4,920,197 A | 4/1990 | Hayashi et al. | 528/190 |
| 4,937,310 A | 6/1990 | Hayashi et al. | 528/193 |
| 4,966,956 A | 10/1990 | Andreu et al. | 528/185 |
| 4,983,713 A | 1/1991 | Hayashi et al. | 528/190 |
| 5,025,082 A | 6/1991 | Kishiro et al. | 528/190 |
| 5,037,939 A | 8/1991 | Eckhardt et al. | 528/193 |
| 5,055,546 A | 10/1991 | Sugimoto et al. | 528/193 |
| 5,066,767 A | 11/1991 | Matzner et al. | 528/193 |
| 5,089,594 A | 2/1992 | Stern et al. | 528/194 |
| 5,097,001 A | 3/1992 | Layton et al. | 528/193 |
| 5,125,818 A | 6/1992 | Yeh | 425/131.5 |
| 5,162,074 A | 11/1992 | Hills | 156/644 |
| 5,171,823 A | 12/1992 | Charbonneau et al. | 528/193 |
| 5,204,443 A | 4/1993 | Lee et al. | 528/184 |
| 5,344,297 A | 9/1994 | Hills | 425/131.5 |
| 5,399,656 A | 3/1995 | Nitta et al. | 528/193 |
| 5,445,884 A | 8/1995 | Hoyt et al. | 428/370 |
| 5,508,374 A | 4/1996 | Lee et al. | 528/184 |
| 5,525,700 A | 6/1996 | Samuels et al. | 528/190 |
| 5,618,479 A | 4/1997 | Lijten et al. | 264/103 |
| 5,656,714 A | 8/1997 | Shen et al. | 528/193 |
| 5,663,276 A | 9/1997 | Yoneta et al. | 528/194 |
| 5,798,432 A | 8/1998 | Lee et al. | 528/176 |
| 5,948,528 A | 9/1999 | Helms, Jr. et al. | 428/373 |
| 6,074,590 A | 6/2000 | Gownder | 264/172.12 |
| 6,132,884 A | 10/2000 | Linstid, III et al. | 428/480 |
| 6,140,455 A | 10/2000 | Nagashima et al. | 528/190 |
| 6,294,640 B1 * | 9/2001 | Linstid, III et al. | 528/190 |
| 6,346,568 B1 * | 2/2002 | Maeda et al. | 524/495 |

* cited by examiner

STRETCHABLE LIQUID CRYSTAL POLYMER COMPOSITION

FIELD OF THE INVENTION

The present invention relates to a stretchable liquid crystal polymer (LCP) composition suitable for use in the production of a variety of shaped articles including films, fibers, multilayer laminates and blow molded forms. This invention also relates to a process for stretching a multilayer laminate where one of the layers is made from the stretchable LCP composition.

BACKGROUND OF THE INVENTION

Anisotropic melt-forming polymers, also known as liquid crystalline polymers or "LCPs", are well known in the art. Anisotropic melt-forming polymers exhibit a parallel ordering of molecular chains in the melt phase and are also termed "thermotropic" liquid crystal polymers. Many of these materials are wholly aromatic in nature.

Commercially available LCPs are known to have many excellent physical properties compared to conventional polymers, such as higher tenacity and modulus. LCPs are also excellent barriers to transmission of chemicals, gases and water vapor. The LCPs can be used as gas barrier layers in conjunction with other thermoplastic materials to reduce the transmission of gases in packages. However, one problem that conventional LCPs have is their inability to be used in applications that require a post orientation process such as fiber stretching, film orientation and thermoforming. Conventional thermoplastics that are not stretched or drawn tend to have poor physical properties such as low tenacity and modulus. These conventional thermoplastics must be heated above their glass transition temperature, typically between 130 and 160° C., and stretched in order to orient the polymer and improve their physical properties. The problem with conventional LCPs is that they can not be used as barrier layers for oriented packaging because they do not stretch well at temperatures typically used for conventional thermoplastic orientation processes.

Therefore, it is an object of the present invention to provide a liquid crystal polymer that is stretchable at temperatures typically used in thermoplastic orientation processes for the packaging industry.

This and other objects of this invention will be apparent from the following detailed invention.

U.S. Pat. No. 6,132,884 to Linstid III et al. discloses a stretchable LCP containing units derived from p-hydroxybenzoic acid, 6-hydroxy-2-naphthoic acid, at least one aromatic diacid and an aromatic diol, a portion of which is 4,4'-biphenol, resorcinol and at least one additional monomer that provides the resulting polymer with selected meta linkages.

U.S. Ser. No. 09/483,765 to Linstid IIII et al. describes a stretchable LCP containing units derived from p-hydroxybenzoic acid, 6-hydroxy-2-naphthoic acid, an aromatic diacid, at least a portion of which comprises 2,6-naphthalene dicarboxylic acid, and an aromatic diol and/or aromatic aminophenol component, at least a portion of which is 4,4'-biphenol and resorcinol.

U.S. Ser. No. 09/483,103 to Linstid IIII et al. describes a stretchable LCP containing units derived p-hydroxybenzoic acid, 6-hydroxy-2-naphthoic acid, at least one aromatic diacid and at least one aromatic diol and/or aromatic aminophenol component, at least a portion of which is 4,4'-biphenol and one or more aromatic monomers, excluding resorcinol, that provide the polymers with selected meta linkages.

U.S. Pat. No. 5,656,714 discloses an amorphous and what are termed "semi-crystalline" polymers having recurring units derived from p-hydroxybenzoic acid, 6-hydroxy-2-naphthoic acid, terephthalic acid, 4,4'-biphenol, and resorcinol. The polymers exemplified by U.S. Pat. No. 5,656,714 vary in terms of their degree of crystallinity; some, but not all, of these polymers are highly stretchable.

U.S. Pat. No. 4,910,284 to Hijikata et al. describes polymers consisting of 35 to 90 mole % of a p-hydroxybenzoic acid moiety, 0.5 to 30 mole % of a 6-hydroxy-2-naphthoic acid moiety and 0.5 to 30 mole % of a m-hydroxybenzoic acid moiety. The patent does not describe that any of the compositions are stretchable at temperatures typically used in the packaging industry.

U.S. Pat. No. 4,337,190 to Calundann describes a polymer consisting of 6-hydroxy-2-naphthoic acid moiety and m-hydroxybenzoic acid moiety.

U.S. Pat. No. 4,130,545 to Calundann describes a polymer consisting p-hydroxybenzoic acid moiety, 2,6-naphthalene dicarboxylic acid moiety, m-hydroxybenzoic acid moiety, and an aromatic diol moiety.

SUMMARY OF THE INVENTION

The objects of the present invention are achieved by providing a stretchable polymer consisting essentially of recurring units I, II and III wherein recurring unit I is:

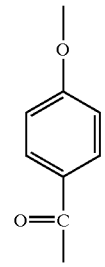

recurring unit II is:

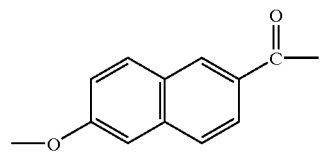

and recurring unit III is:

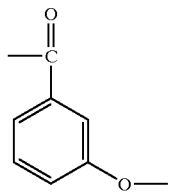

wherein said polymer has a composition within region A of FIG. 1.

This invention also provides a process for stretching a multilayer laminate comprising the steps of: (a) providing a multilayer laminate comprising a layer of a thermoplastic and a layer of a polymer consisting essentially of recurring units I, II and III described above where the polymer has a composition within region B of FIG. 2; and b) stretching said laminate greater than about 100% elongation at a temperature greater than the first order transition point of said polymer and less than about 200° C.

BRIEF DESCRIPTION OF THE DRAWINGS

Reference now is made to the accompanying drawings.

DETAILED DESCRIPTION OF THE INVENTION

Figure 1:
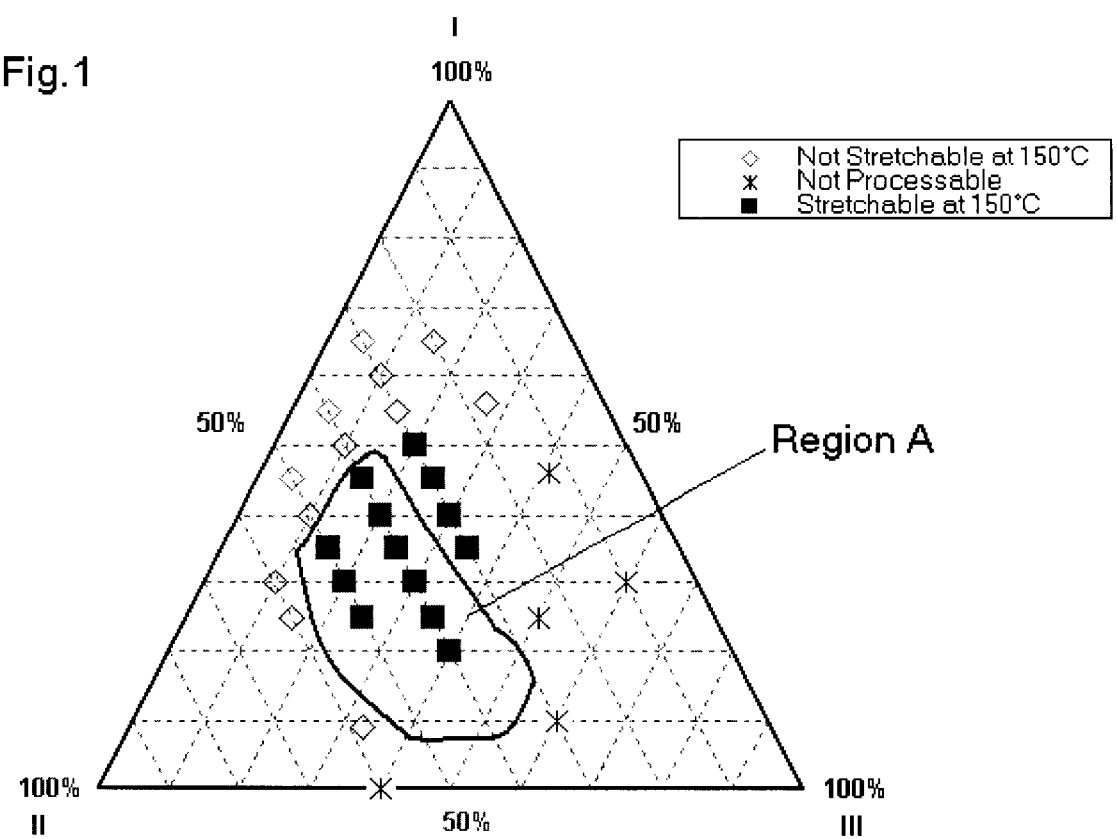
FIG. 1 is a compositional triangular diagram expressed as mole percent of the three component polymer system showing Region A.

The present invention relates to a stretchable LCP consisting essentially of recurring units I, II and III wherein recurring unit I is:

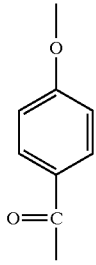

recurring unit II is:

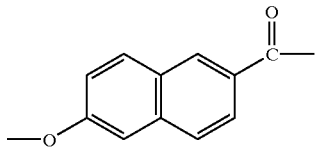

and recurring unit III is:

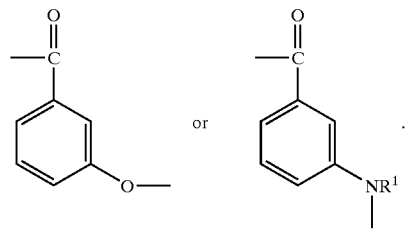

where $R^1$ is independently selected from the group consisting of hydrogen and $C_1$ to $C_6$ alkyl and where the polymer is stretchable.

The inventors have discovered that the combination of these components provide a stretchable LCP. While almost all liquid crystalline polymers are stretchable in the melt, relatively few are stretchable at temperatures below which they are molten. The extent to which a polymer can be stretched or drawn depends upon the temperature at which stretching occurs as well as the form and size of the material that is being stretched. In the present application, the term "stretchable" means that tapes made from the polymer are capable of being stretched to at least 100% elongation (i.e., %100 break strain) at 150° C. before the break or rupture point of the tapes according to the Tape Stretching Procedure set forth below. It should be noted that most commercial LCPs can not be stretched more than a few percent elongation at 150° C. using the Tape Stretching Procedure.

Break Strain or Percent elongation is the final length ($L_f$) of the polymer after stretching minus the initial length ($L_i$) before stretching divided by the initial length $L_i$ (i.e., % elongation=$(L_f-L_i)/L_i$)). For a film or other two-dimensional articles, the percent elongation is measured by the initial and final areas of the article.

The polymers of the present invention consist essentially of three different recurring units. Unit I of the subject polymers, termed a para-oxybenzoyl unit, possesses the structural formula:

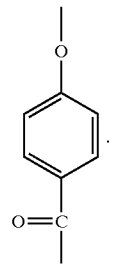

While not specifically illustrated in the structural formula, at least some of the hydrogen atoms present on the aromatic ring of unit I may be substituted. Included among the representative precursors from which recurring unit I may be derived are: 4-hydroxybenzoic acid; 3-chloro-4-hydroxybenzoic acid; 3-methyl-4-hydroxybenzoic acid; 3-methoxy-4-hydroxybenzoic acid 3-phenyl-4-20 hydroxybenzoic acid; 3,5-dichloro-4-hydroxybenzoic acid; 3,5-dimethyl-4-hydroxybenzoic acid; 3,5-dimethoxy-4-hydroxybenzoic acid; and the like. In a preferred embodiment, no ring substitution is present on recurring unit I.

Recurring unit II of the subject polymers, termed a 6-oxy-2-naphthoyl unit, possesses the structural formula:

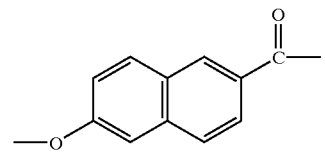

As in the case of recurring unit I, at least some of the hydrogen atoms present on the aromatic ring structure of recurring unit II may be substituted. Exemplary of such substituents are alkyl groups of 1 to 4 carbon atoms, alkoxy groups of 1 to 4 carbon atoms, phenyl, halogen (e.g., CI, Br, and I), and mixtures thereof. Representative of the precursors from which recurring unit II may be derived are aromatic hydroxy-naphthoic acids which include: 6-hydroxy-2-naphthoic acid; 6-hydroxy-5-chloro-2-naphthoic acid; 6-hydroxy-5-methyl-2-naphthoic acid; 6-hydroxy-5-methoxy-2-naphthoic acid; 6-hydroxy-5-phenyl-2-naphthoic acid; 6-hydroxy-7-chloro-2-naphthoic acid; 6-hydroxy-5,7-dichloro-2-naphthoic acid, and the like. In a preferred embodiment no ring substitution is present on recurring unit II.

Recurring unit III of the subject polymers can be selected from:

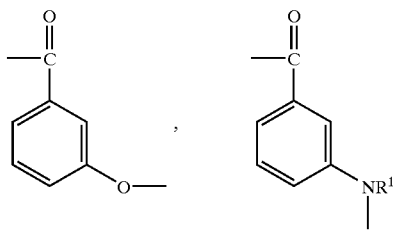

and mixtures thereof, wherein $R^1$ is independently selected from the group consisting of hydrogen and $C_1$ to $C_6$ alkyl. Although not specifically illustrated in the structural formulas given, the aromatic ring structure of recurring unit III may be substituted in a manner similar to that described for recurring unit I. Preferably no ring substitution is present on recurring unit III. Included among the representative precursors from which recurring III is m-aminobenzoic acid and m-hydroxybenzoic acid.

When recurring unit III is a moiety that introduces an esteramide linkage to the resultant polymer, i.e., when recurring unit III is:

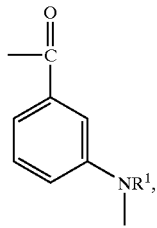

termed a meta-aminobenzyol moiety, the $T_g$ values of the resultant polymers tend to be greater than that of similar polymers wherein recurring unit III consists of meta-hydroxybenzoyl units. The solid to nematic transition temperature of polymers having such esteramide linkages is also increased, as well as the processing temperature thereof.

Minor amounts of other units that provide ester or esteramide linkages may be present provided, that such units, do not obviate the properties desired by this invention.

In one embodiment of the present invention recurring unit I is present in an amount of about 15 to about 35 mole %, recurring unit II is present in an amount of from about 20 to about 55 mole %, preferably about 30 to about 50 mole % and recurring unit III is present in an amount of from about 12 to about 48 mole %, preferably from about 12 to about 25 mole %.

In another embodiment of the present invention recurring unit I is present in an amount of about 10 to about 50 mole %, recurring unit II is present in an amount of from about 35 to about 55 mole % and recurring unit III is present in an amount of from about 12 to about 50 mole %, preferably about 12 to 25 mole %.

In yet another embodiment of the present invention recurring unit I is present in an amount of about 10 to about 50 mole %, recurring unit 11 is present in an amount of from about 35 to about 45 mole % and recurring unit II is present in an amount of from about 8 to about 50 mole %.

In still yet another embodiment of the present invention the polymer has a composition within Region A of FIG. 1. FIG. 1 is a compositional triangular diagram expressed as mole percent of a three component polymer system. The top point of the triangle represents a polymer containing 100% p-hydroxybenzoyl moiety (4-HBA), the left point of the triangle represents a polymer containing 100% 6-hydroxy-2-napthoyl moiety (HNA) and the right point of the triangle represents a polymer containing 100% m-hydroxybenzoyl moiety (3-HBA). Points within the triangle, such as Region A, would represent polymer compositions containing all three components.

Preferably, the composition of the polymer within region A in the above embodiment would have recurring unit III present in an amount less than about 40 mole %, more preferably less than about 30 mole % and even more preferably less than about 20 mole %.

FIG. 1 also contains data points of polymer compositions. Polymer compositions that are stretchable according to the tape stretching procedure at 150° C. are identified by squares, those compositions that are not stretchable are identified by diamonds and those composition that could not be processed are identified by asterisks. Data used to prepare FIG. 1 is shown in Table 1 below.

The stretchable polymer of the present invention may be processed into various shaped articles by known conventional thermoplastic processes. Shaped articles are any type of articles or parts formed by conventional processes, including but not limited to injection molding, co-extrusion, extrusion blow molding, stretch blow molding, biaxial stretch blow molding, vacuum forming, compression molding, dry lamination, sandwich lamination, thermoforming, fiber spinning, or combinations thereof. The polymer may also be used in composites.

The polymers of the present invention are particularly suited for forming sheets and films because of their ability to be heat stretched at temperatures used for conventional thermoplastics. Hollow shaped articles such as containers (e.g., bottles, bags, tanks, packages and the like) may be produced by extrusion blow molding, direct blowing, injection blow molding, biaxial stretch blow molding or the like processes.

The polymers of the present invention have advantages over conventional LCP polymers because of their ability to be stretched in combination with excellent gas barrier properties. The stretchable polymers are especially suitable for various packaging material and containers for which high oxygen barrier properties are required such as foods, medicines, cosmetics, textiles industrial chemicals, and the like.

Further, the stretchable polymers may also be used for producing fibers such as monofilaments, multifilaments and bicomponent fibers using conventional fiber forming equipment.

Particularly, the polymers may be used as at least one component in a bicomponent fiber because of their ability to be stretched at temperatures used for fiber stretching. Bicomponent fibers are well known and may be defined as a fiber having at least two distinct cross-sectional domains respectively formed from polymers having different relative viscosities. The distinct domains may be formed by at least two different polymers, or the same polymer class having different relative viscosities. Bicomponent fibers are intended to include, but are not limited to core and sheath fiber structures, side by side fiber structures, tipped fiber structures, micro-denier structures and mixed fiber structures. These types of Bicomponent fiber structures are described in U.S. Pat. No. 6,074,590, herein incorporated by reference.

Figure 2:
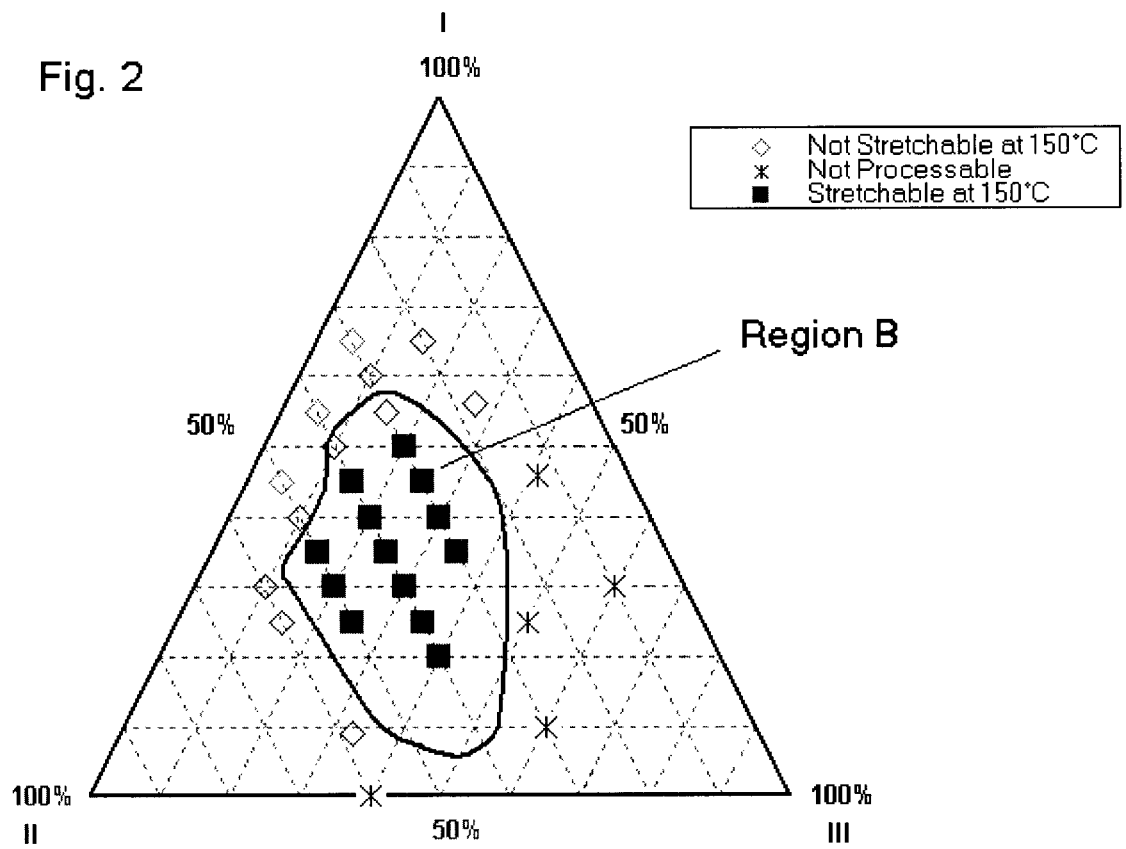
FIG. 2 is a compositional triangular diagram expressed as mole percent of the three component polymer system showing Region B.

This invention also involves a process for stretching a multilayer laminate comprising the steps of: (a) providing a multilayer laminate comprising a layer of a thermoplastic and a layer of a polymer consisting essentially of recurring units I, II and III wherein recurring unit I is:

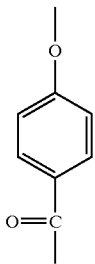

recurring unit II is:

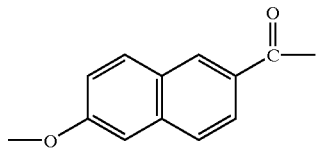

and recurring unit III is:

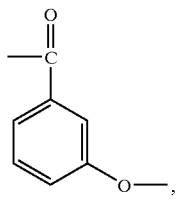

where said polymer has a composition within Region B of FIG. 2 or Region A of FIG. 1; and b) stretching said laminate greater than about 100% elongation at a temperature greater than the first order transition point (e.g., the glass transition temperature Tg) of the polymer and less than about 200° C., or at a temperature of from about 120° C. to about 160° C.

FIG. 2 is similar to FIG. 1 and is a compositional triangular diagram expressed as mole percent of a three component polymer system. FIG. 2 illustrates Region B where it is believed that the composition of the polymer is stretchable at temperatures greater than the first order transition point of the polymer and less than about 200° C.

Preferably, the composition of the polymer within region B in the above embodiment would have recurring unit III present in an amount less than about 40 mole %, more preferably less than about 30 mole % and even more preferably less than about 20 mole %.

The thermoplastics which may be used as one layer in the multilayer laminate may be any suitable thermoplastic such as polyolefins (e.g., polyethylene and polypropylene), polyesters (e.g., polyethylene terephthalate, polybutylene terephthalate, and polyethylene naphthalate), and polyamides (e.g., nylon). These multilayer laminates may be used to make laminated films, sheets, tubes and the like by co-extrusion, dry lamination, sandwich lamination and like processes. Laminated containers such as bottles, bags, tanks and other like containers may also be produced by blow molding, stretch blow molding, vacuum forming, compression molding or the like molding processes.

The multilayer laminate may further contain an adhesive layer. Any suitable adhesive layer may be used. Examples of suitable general classes of adhesives are: a polyester polyurethane, a polyether polyurethane, a polyester elastomer, a polyether elastomer, a polyamide, a polyether polyamide, a polyether polyimide, or a functionalized polyolefin, where said functionalized polyolefin comprises functional groups selected from the group consisting of: a carboxyl group and its esters, a carboxylic anhydride group, a glycidyl group, an alkoxysilane group and combinations thereof.

Examples of specific adhesives that may be used are ethylene-maleic anhydride copolymer, ethylene-methyl acrylate copolymer, ethylene-methyl acrylate copolymer grafted with maleic anhydride, ethylene-methyl acrylate-maleic acid terpolymer, ethylene-glycidyl methacrylate copolymer, ethylene-methyl acrylate-glycidyl methacrylate terpolymer, ethylene-methyl methacrylate-acrylic acid terpolymer, ethylene-vinyl acetate copolymer, an alkoxysilane modified ethylene-ethylacrylate copolymer, ethylene-acrylic acid copolymer, and a blend of polypropylene grafted with maleic anhydride with a dimer based polyamide.

A major advantage of these laminates is that they can be stretched at temperatures typically used to stretch conventional thermoplastics (e.g., 120° C. to 160° C). The stretching of the laminate orients the conventional thermoplastic polymer and improves the strength of the laminate. Conventional LCPs are typically not used in oriented multilayer laminates because of their inability to be substantially stretched below their molten state.

The polymers of this invention are typically prepared by a polymerization reaction that proceeds through the acetate form of the hydroxycarboxylic acid and amino-carboxylic acid reactants. Thus, it is possible to employ as starting materials reactants having pre-acetylated hydroxyl groups and amino groups, heat the reaction mix to polycondensation temperature and maintain reaction until a desired polymer viscosity is reached. Alternatively, it is possible to acetylate in situ, in which case the aromatic hydroxycarboxylic acid and when present aminocarboxylic acid are reacted with acetic anhydride, acetic acid by-product is removed, the esterified reactants together are heated to polycondensation temperature, and reaction is maintained until a desired polymer viscosity is reached. If the acetylation and polycondensation reactions are conducted in a single reactor, it is common to charge the reactor with the reactant materials in a single step.

The acetylation and polycondensation reactions are typically conducted in the presence of suitable catalysts. Such catalysts are well known in the art and include, for example, alkali and alkaline earth metal salts of carboxylic acids, such as, for example, potassium acetate, sodium acetate, magnesium acetate, and the like. Such catalysts are typically used in amounts of from about 50 to about 500 parts per million based on the total weight of the recurring unit precursors.

Acetylation is generally initiated at temperatures of about 90° C. In the initial stage of the acetylation reflux is desirably employed to maintain vapor phase temperature below the point at which acetic acid byproduct and anhydride begin to distill. Temperatures during the initial stage of acetylation typically range from between 90° to 150° C., preferably about 100° to about 130° C. In order to complete the acetylation, the reaction mixture is then heated to a temperature of about 150° to about 220° C., preferably about 150° to about 200° C., with temperatures of 180° to 200° C. being of particular interest. At this point, if reflux is used, the vapor phase temperature should exceed the boiling point of acetic acid but remain low enough to retain residual acetic anhydride.

To ensure substantially complete reaction, it may be desirable to utilize an excess amount of acetic anhydride in conducting the acetylation. The amount of excess anhydride utilized will vary depending upon the particular acetylation conditions employed, including the presence or absence of reflux. The use of an excess of from about 1 to about 10 mole percent of acetic anhydride, based on the total moles of reactant hydroxyl groups present is not uncommon.

To obtain complete acetylation, anhydride loss should be minimized. Acetic acid vaporizes at temperatures of about 118° C. At higher temperatures, i.e., about 140° C. acetic anhydride also begins to vaporize. Providing the reactor with a means of controlling vapor phase reflux is desirable. Maintaining vapor phase reflux temperature at about 120° to about 130° C. is particularly desirable.

Polycondensation of the acetylated starting materials generally begins to take place at a temperature within a range of from about 210° to about 260° C. As acetic acid is also a byproduct of the polymerization reaction, it is desirable to employ controlled vapor phase reflux when conducting the polycondensation reaction. In the absence of controlled vapor phase reflux, acetic anhydride, acetoxybenzoic acid and other volatile materials are vaporized as the polymerization temperature is increased. Depending on the particular polymer synthesized, it is preferable to maintain vapor phase reflux temperatures of about 120° to about 130° C. during the polymerization reaction.

As the final polymerization temperature is approached, volatile byproducts of the reaction having boiling points above that of acetic acid and acetic anhydride should be removed. Accordingly at reactor temperatures of about 250° to about 300° C., vapor phase reflux, if used, is generally adjusted to allow higher vapor phase temperatures or is discontinued. The polymerization is generally allowed to proceed until a desired polymer viscosity is reached. To build molecular weight in the melt, the polymerization reaction is generally conducted under vacuum, the application of which facilitates the removal of volatiles formed during the final stage of the polycondensation.

Following polymerization, the molten polymer is discharged from the reactor, typically through an extrusion orifice fitted with a die of desired configuration; cooled; and collected. Commonly, the melt is discharged through a perforated die to form strands, which are taken up in a water bath, pelletized and dried.

Tape Stretching Procedure

The testing procedure to determine if the polymer is stretchable in detailed below. Polymers are melt spun into tapes using a Micromelt™ apparatus. The apparatus is equipped with a 0.127 mm by 6.35 mm die. Melt temperatures typically vary between about 250–300° C. depending upon the melt characteristics of the LCP sample. Throughput rates are approximately 0.45 cc/min; take-up roller speeds are approximately 2 rpm; and pack pressures typically range from about 100 kg/cm$^2$ to about 290 kg/cm$^2$, depending upon the $T_g$ (or $T_m$) of the polymer. The resulting tapes will have an approximate thickness of 0.05 mm and a width of about 6 mm.

Test specimens for stretching should be about 12.7 cm in length cut from each tape. Specimens are placed in a preheated Instron oven, allowed 6 minutes to come to test temperature, e.g., 120 to 200° C., and then tested on an Instron type universal tester that is equipped with a thermal chamber at the test temperature. The gauge length is set at approximately 25 mm and the crosshead speed is set at approximately 50.8 mm/min. The % break strain or the percent elongation is calculated at the break point.

EXAMPLES

The following examples are presented to further illustrate this invention. The examples are not, however, intended to limit the invention in any way.

Examples 1 to 31

To a 3-necked cylindrically shaped flask equipped with a stainless steel "C"-shaped agitator, gas inlet tube, thermocouple, distilling trap and Vigreux column attached to a condenser and receiver were added:

372.6 grams p-hydroxybenzoic acid 451.2 grams 6-hydroxy-2-naphthoic acid 124.2 grams of m-hydroxybenzoic acid 623.7 grams of acetic anhydride (1 mole-% excess)

0.06 grams of potassium acetate (30 ppm)

The flask was purged of oxygen by evacuation and flushing with dried nitrogen and immersed into an electrically heated fluidized sand bath. The contents of the flask were heated to ~150° C. while stirring at 75 rpm to acetylate hydroxyl groups. Temperature was raised from 150° to 220° C. over a period of 70 minutes to distill by-product acetic acid. Polymerization commenced at 220° C. and batch temperature was raised to 320° C. over a period of 110 minutes. During this time acetic acid that evolved was removed by distillation. After a 30 minute hold time at 320° C., vacuum was applied, and the pressure gradually reduced to ~5 mm Hg over a period of 20 minutes. The vacuum was maintained until the torque required to maintain agitator speed reached the target value necessary to give the desired melt viscosity (MV). At the target torque the vacuum was discontinued and the flask brought to atmospheric pressure with dry nitrogen.

This process produced a polyester having a melt viscosity of ~900 poise at a shear rate of 1000 sec$^{-1}$, measured at 270° C. in a capillary rheometer using an orifice 1 mm in diameter and 20 mm long.

Differential Scanning Caliometry (DSC) (20° C./min. heating rate) indicated that the polymer had a $T_g$ of 103° C., and a $T_m$ of 192° C.

Additional polymers were made and tested following a similar procedure. Table 1 lists the various Examples together with the mole percentages of the reactant monomers employed. Abbreviations are as follows:

"p-HBA" means p-hydroxybenzoic acid;

"HNA" means 6-hydroxy-2-naphthoic acid;

"m-HBA" or "3-HBA" means m-hydroxybenzoic acid;

All polymerizations were conducted in the presence of 30 ppm potassium acetate, using 1 mole % excess acetic anhydride to completely acetylate the hydroxyl groups present.

Hot stage microscopy with polarized light was used to confirm that all of the polymers were optically anisotropic. The polymers contained molar quantities of recurring units that corresponded to the molar charge of the reactant monomers. M.V., $T_m$, and $T_g$ data for the polymers (measured as described above) are reported in Table 1.

The above polymers were tested for stretchability using the Tape Stretching Procedure described above. The % break strain was calculated at break point. The % break strain is reported in Table 1 as the average of the for the five specimens tested. The data presented in Table 1 was used to pre-pare FIG. 1.

TABLE 1

| Example # | COMPOSITION | | | $T_m$ (° C.) | $T_g$ (° C.) | MV @ 270° C. 1000/s | % Break Strain @ 150° C. |
|---|---|---|---|---|---|---|---|
| | HBA | HNA | 3-HBA | | | | |
| 1 | 45 | 40 | 15 | 192 | 103 | 864 | 631 |
| 2 | 55 | 40 | 5 | 226 | — | 719 | 8 |
| 3 | 50 | 40 | 10 | 202 | 102 | 803 | 55 |
| 4 | 40 | 40 | 20 | — | 104 | 887 | 767 |
| 5 | 35 | 40 | 25 | — | 105 | 1249 | 579 |
| 6 | 30 | 40 | 30 | — | 106 | 1629 | 517 |
| 7 | 25 | 40 | 35 | — | 108 | 2225 | 521 |
| 8 | 20 | 40 | 40 | — | 108 | 2456 | 344 |
| 9 | 65 | 30 | 5 | 235 | — | 864 | 3 |
| 10 | 60 | 30 | 10 | 229 | 101 | 935 | 43 |
| 11 | 55 | 30 | 15 | — | 101 | 772 | 75 |
| 12 | 50 | 30 | 20 | — | 101 | 900 | 399 |
| 13 | 45 | 30 | 25 | — | 102 | 1202 | 667 |
| 14 | 40 | 30 | 30 | — | 103 | 1330 | 488 |
| 15 | 35 | 30 | 35 | — | 105 | 1438 | 625 |
| 16 | 45 | 50 | 5 | 236 | — | 912 | 9 |
| 17 | 40 | 50 | 10 | 217 | 103 | 1077 | 48 |
| 18 | 35 | 50 | 15 | 210 | 105 | 1003 | 138 |
| 19 | 30 | 50 | 20 | — | 106 | 1247 | 183 |
| 20 | 25 | 50 | 25 | — | 107 | 1442 | 305 |
| 21 | 65 | 20 | 15 | 279 | 101 | 3624 | 4 |
| 22 | 30 | 60 | 10 | 244 | 106 | 1021 | 14 |
| 23 | 25 | 60 | 15 | 245 | 106 | 1292 | 25 |
| 24 | 56 | 17 | 27 | 264 | 101 | | 12 |
| 25 | 9 | 58 | 33 | 288 | 113 | | 26 |
| 26 | 0 | 60 | 40 | 324 | 119 | Brittle - will not process | — |
| 27 | 25 | 25 | 50 | — | 145 | Brittle - will not process | — |
| 28 | 0 | 60 | 40 | 331 | 146 | Brittle - will not process | — |
| 29 | 30 | 10 | 60 | — | 144 | Brittle - will not process | — |
| 30 | 10 | 30 | 60 | — | 151 | Brittle - will not process | — |
| 31 | 46 | 13 | 41 | — | 101 | Brittle - will not process | — |
| 32 | 50 | 40 | 10 | 202 | 102 | 803 | 243(@ 180° C.) |
| 33 | 60 | 30 | 10 | 229 | 101 | 935 | 26(@ 180° C.) |
| 34 | 55 | 30 | 15 | — | 101 | 772 | 194(@ 180° C.) |
| 35 | 40 | 50 | 10 | 217 | 103 | 1077 | 22(@ 180° C.) |

The foregoing is illustrative of the present invention and is not construed as limiting thereof. The invention is defined by the following claims with equivalents of the claims to be included therein.

What is claimed is:

1. A stretchable polymer consisting essentially of recurring units I, II and III wherein recurring unit I is:

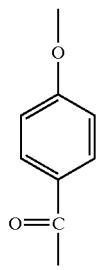

recurring unit II is:

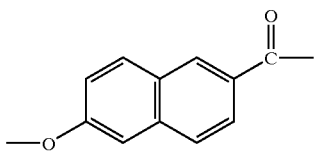

and recurring unit III is:

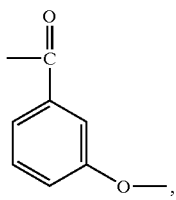

wherein said polymer has a composition within region A of FIG. 1.

2. The polymer of claim 1 wherein the amount of said recurring unit III is less than about 40 mole %.

3. The polymer of claim 1 wherein the amount of said recurring unit III is less than about 20 mole %.

4. The polymer of claim 1 wherein said polymer is formed into a film, sheet, fiber, composite or shaped article.

5. A multilayer laminate comprising a layer of a thermoplastic resin and a layer of the polymer of claim 1.

6. The multilayer laminate of claim 5 further comprising an adhesive layer.

7. A stretchable polymer consisting essentially of recurring units I, II and III wherein recurring unit I is:

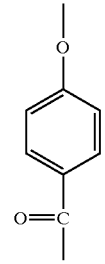

recurring unit II is:

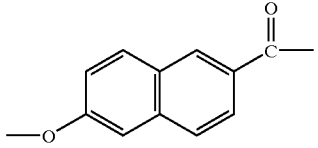

and recurring unit III is selected from the group consisting of:

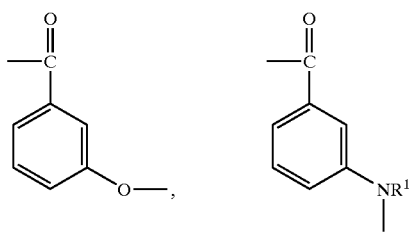

and mixtures thereof, wherein $R^1$ is independently selected from the group consisting of hydrogen and $C_1$ to $C_6$ alkyl, and wherein the amount of recurring unit us present in an amount of from about 15 to about 35 mole %, recurring unit II is present in an amount of from about 20 to about 55 mole % and recurring unit III is present in an amount of from about 12 to about 48 mole %.

8. The polymer of claim 7 wherein recurring unit III is:

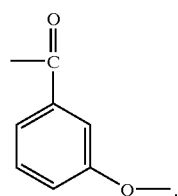

9. The polymer of claim 7 wherein recurring unit III is:

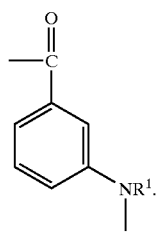

10. The polymer of claim 7 wherein the amount of recurring unit II is present in an amount of from about 30 to about 50 mole % and recurring unit III is present in an amount of from about 12 to about 25 mole %.

11. The polymer of claim 7 wherein said polymer is formed into film, sheet, fiber, composite or shaped article.

12. A multilayer laminate comprising a layer of a thermoplastic resin and a layer of the polymer of claim 7.

13. The multilayer laminate of claim 12 further comprising an adhesive layer.

14. A polymer consisting essentially of recurring units I, II and III wherein recurring unit I is:

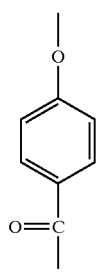

recurring unit II is:

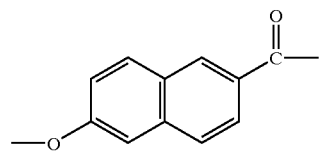

and recurring unit III is:

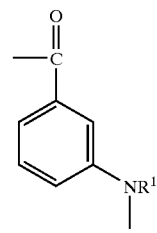

wherein $R^1$ is independently selected from the group consisting of hydrogen and $C_1$ to $C_6$ alkyl, and wherein recurring unit I is present in an amount of from about 15 to about 35 mole %, recurring unit II is present in an amount of from about 20 to about 55 mole % and recurring unit III is present in an amount of from about 12 to about 48 mole % wherein said polymer has a composition within region A of FIG. 1.

15. The polymer of claim 14 wherein recurring unit II is present in an amount of from about 30 to about 50 mole/o and recurring unit Ill is present in an amount of from about 12 to about 25 mole %.

16. A stretchable polymer consisting essentially of recurring units I, II and III wherein recurring unit I is:

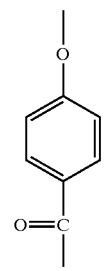

recurring unit II is:

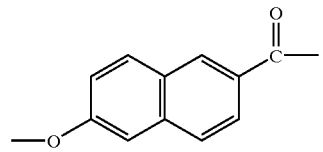

and recurring unit Ill is selected from the group consisting of:

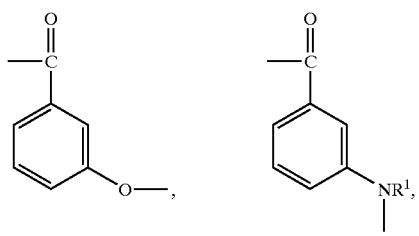

and mixtures thereof, wherein $R^1$ is independently selected from the group consisting of hydrogen and $C_1$ to $C_6$ alkyl, and wherein the amount of recurring unit I is present in an amount of about 10 to about 50 mole %, recurring unit II is present in an amount of from about 35 to about 55 mole % and recurring unit III is present in an amount of from about 12 to about 50 mole %.

17. The polymer of claim 16 wherein recurring unit III is:

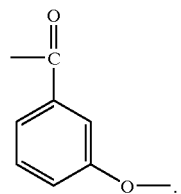

18. The polymer of claim 16 wherein recurring unit III is:

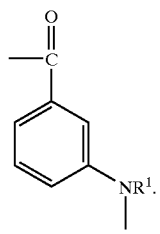

19. The polymer of claim 16 wherein the amount of recurring unit III is present in an amount of from about 12 to about 25 mole %.

20. The polymer of claim 16 wherein said polymer is formed into film, sheet, fiber, composite or shaped article.

21. A multilayer laminate comprising a layer of a thermoplastic resin and a layer of the polymer of claim 16.

22. The multilayer laminate of claim 21 further comprising an adhesive layer.

23. A polymer consisting essentially of recurring units I, II and III wherein recurring unit is:

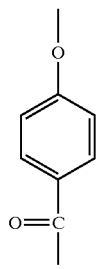

recurring unit II is:

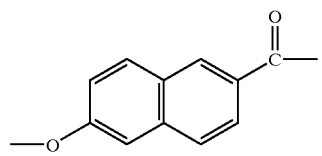

and recurring unit III is:

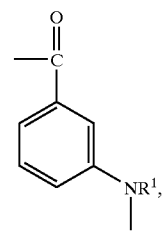

wherein $R^1$ is independently selected from the group consisting of hydrogen and $C_1$ to $C_6$ alkyl, and wherein recurring unit I is present in an amount of about 10 to about 50 mole %, recurring unit II is present in an amount of from about 35 to about 55 mole % and recurring unit III is present in an amount of from about 12 to about 50 mole % wherein said polymer has a composition within region A of FIG. 1.

24. The polymer of claim 23 wherein recurring unit III is present in an amount of from about 12 to about 25 mole %.

25. A process for stretching a multilayer laminate comprising the steps of:

(a) providing a multilayer laminate comprising a layer of a thermoplastic and a layer of a polymer consisting essentially of recurring units I, II and III wherein recurring unit I is:

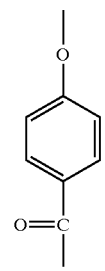

recurring unit II is:

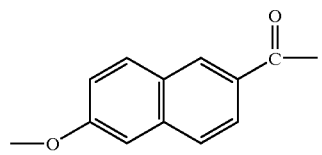

and recurring unit III is:

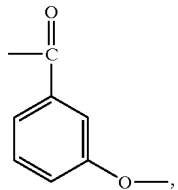

wherein said polymer has a composition within region B of FIG. 2;

b) stretching said laminate greater than about 100% elongation at a temperature greater than the first order transition point of said polymer and less than about 200° C.

26. The process of claim 25 where said laminate is stretched to greater than about 100% elongation at a temperature of from about 120° C. to about 160° C.

27. The process of claim 25 wherein the amount of said recurring unit III is less than about 40 mole %.

28. The process of claim 25 wherein the amount of said recurring unit III is less than about 20 mole %.

29. The process of claim 25 wherein said laminate further comprises an adhesive layer.

* * * * *